US009530318B1

(12) United States Patent
Turner et al.

(10) Patent No.: US 9,530,318 B1
(45) Date of Patent: Dec. 27, 2016

(54) TOUCHSCREEN-ENABLED ELECTRONIC DEVICES, METHODS, AND PROGRAM PRODUCTS PROVIDING PILOT HANDWRITING INTERFACE FOR FLIGHT DECK SYSTEMS

(71) Applicant: HONEYWELL INTERNATIONAL INC., Morristown, NJ (US)

(72) Inventors: Nathan Shaughn Turner, Phoenix, AZ (US); Charles Dairman, Buckeye, AZ (US); Kelsey Begaye, Peoria, AZ (US); Sue McCullough, Phoenix, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 5 days.

(21) Appl. No.: 14/810,717

(22) Filed: Jul. 28, 2015

(51) Int. Cl.
*G08G 5/00* (2006.01)
*G06F 3/0488* (2013.01)

(52) U.S. Cl.
CPC ......... *G08G 5/0021* (2013.01); *G06F 3/04883* (2013.01); *G08G 5/003* (2013.01)

(58) Field of Classification Search
CPC .... G08G 5/0021; G08G 5/003; G06F 3/04883
See application file for complete search history.

(56) References Cited

U.S. PATENT DOCUMENTS

| | | | | |
|---|---|---|---|---|
| 5,502,803 A | * | 3/1996 | Yoshida | G06F 17/24 345/179 |
| 5,754,430 A | * | 5/1998 | Sawada | G01C 21/3605 340/990 |
| 5,787,455 A | * | 7/1998 | Seybold | G06K 9/033 382/188 |
| 5,844,503 A | * | 12/1998 | Riley | G05D 1/0061 340/945 |
| 6,938,220 B1 | * | 8/2005 | Shigematsu | G06F 3/0481 382/187 |
| 6,963,292 B1 | * | 11/2005 | White | B64D 45/0015 340/426.12 |

(Continued)

FOREIGN PATENT DOCUMENTS

CN 101286245 A1 10/2008

OTHER PUBLICATIONS

Ming Labs,; "FLIGHTLINK," Cockpit Voice Recorder App, Ming Labs, 2014.
Phatware,; "PenOffice," Phatware, 2015.

*Primary Examiner* — Calvin Cheung
(74) *Attorney, Agent, or Firm* — Lorenz & Kopf, LLP

(57) ABSTRACT

Embodiments of a touchscreen-enabled electronic device (referred to as a "digital pilot notepad"), methods, and program products facilitating the entry of handwritten pilot data into one or more flight deck systems are disclosed. In one embodiment, the digital pilot notepad includes an avionics interface over which alphanumeric input data is transmitted to a flight deck system, a touchscreen device, and a controller operably coupled to the avionics interface and to the touchscreen device. The controller is configured to digitally capture a handwritten pilot note written on the touchscreen device by a pilot, convert the handwritten pilot note to alphanumeric input data in a format compatible with the flight deck system, and subsequently submit the alphanumeric input data to the flight deck system over the avionics interface.

20 Claims, 8 Drawing Sheets

(56) References Cited

U.S. PATENT DOCUMENTS

| | | | |
|---|---|---|---|
| 7,113,857 B2 | 9/2006 | Ilan et al. | |
| 7,346,854 B2* | 3/2008 | Hedrick | G06F 3/04847 701/14 |
| 7,418,319 B2* | 8/2008 | Chen | G01C 23/00 701/14 |
| 7,961,943 B1 | 6/2011 | Zeevi | |
| 8,799,798 B2* | 8/2014 | Ito | G06F 3/04883 715/764 |
| 8,886,372 B2* | 11/2014 | Nikolic | G01C 23/005 340/665 |
| 2002/0080123 A1* | 6/2002 | Kennedy | G06F 3/041 345/173 |
| 2003/0055655 A1* | 3/2003 | Suominen | G06F 3/167 704/276 |
| 2005/0041865 A1* | 2/2005 | Zhen | G06K 9/3283 382/187 |
| 2005/0231390 A1* | 10/2005 | Crane | G01C 23/005 340/945 |
| 2006/0062470 A1* | 3/2006 | Zhu | G06K 9/222 382/186 |
| 2007/0198141 A1* | 8/2007 | Moore | B64D 43/00 701/3 |
| 2007/0274591 A1 | 11/2007 | Chang | |
| 2008/0235634 A1* | 9/2008 | Stefani | G06F 3/0482 715/866 |
| 2008/0259029 A1* | 10/2008 | Yang | G06F 3/0317 345/158 |
| 2009/0087095 A1* | 4/2009 | Webb | G06F 3/04883 382/189 |
| 2009/0289902 A1* | 11/2009 | Carlvik | G06F 3/04883 345/173 |
| 2010/0001132 A1* | 1/2010 | Detouillon | G01C 23/00 244/118.5 |
| 2011/0125347 A1* | 5/2011 | Boorman | G01C 23/00 701/11 |
| 2013/0050141 A1* | 2/2013 | Park | G06F 3/0488 345/174 |
| 2013/0249814 A1* | 9/2013 | Zeng | G06F 3/0488 345/173 |
| 2013/0265425 A1* | 10/2013 | Smailus | G01C 23/00 348/148 |
| 2014/0015776 A1 | 1/2014 | Kim et al. | |
| 2014/0019905 A1* | 1/2014 | Kim | G06F 3/0481 715/780 |
| 2014/0124644 A1* | 5/2014 | Wong | E05B 73/0082 248/553 |
| 2014/0365949 A1* | 12/2014 | Xia | G06K 9/00436 715/780 |
| 2015/0177883 A1* | 6/2015 | Sontag | G06F 3/044 345/174 |
| 2015/0260525 A1* | 9/2015 | Parthasarathy | G01C 23/00 701/538 |
| 2016/0027312 A1* | 1/2016 | Kneuper | G06F 3/0416 701/120 |

\* cited by examiner

TOUCHSCREEN-ENABLED ELECTRONIC DEVICES, METHODS, AND PROGRAM PRODUCTS PROVIDING PILOT HANDWRITING INTERFACE FOR FLIGHT DECK SYSTEMS

TECHNICAL FIELD

The following disclosure relates generally to aircraft and, more particularly, to electronic devices enabling a pilot to input handwritten command data into and otherwise interface with flight deck systems onboard an aircraft, as well as to related methods and program products.

BACKGROUND

Pilots commonly keep a clipboard or notepad in a readily-accessible location, such as strapped to a pilot's knee or mounted to a yoke of an aircraft. During the course of a flight, a pilot may utilize the notepad to jot down important bits of information including navigational clearances or commands issued by Air Traffic Control (ATC). Such navigational commands often contain relatively long sequences of alphanumeric characters, which can be difficult to remember if not written down. After receiving and writing down an ATC-issued command, the pilot may then verbally repeat the command to the ATC to ensure that the command was accurately transcribed on the notepad. Additionally, the pilot may query the ATC or independently research any portions of the navigational command that appear questionable or unfamiliar to the pilot. After the pilot is satisfied that the details or "data elements" of the navigational command are correct, the pilot may manually enter the command elements into the appropriate flight deck system. For example, in the case of a hold pattern command, the pilot may manually program the command elements into the Flight Management System (FMS) utilizing a designated interface, such as an alphanumeric keypad provided on a Multi-Purpose Control Display Unit (MCDU). Afterwards, the pilot may review the MCDU display screen to ensure accurate entry of the command elements and then utilize the MCDU keypad to execute the navigational command.

The above-described manual transcription process (i.e., the process of writing the details of an ATC-issued navigational commands onto a notepad, verbally repeating the navigational command to the ATC to ensure the command was accurately transcribed, and then further referencing the notepad when programming a flight deck system) is intuitive and simplistic. However, by its nature, such practice is also cumbersome, time consuming, and largely antiquated. Not only does the practice of manually transcribing navigational commands onto a notepad increase pilot "heads-down" time, it also presents multiple opportunities for the introduction of human error and undue confusion in the programming of the flight deck systems. As a still further drawback, the above-described process can significantly increase pilot workload by requiring a pilot to engage in additional, potentially tedious tasks to resolve any portions of a navigational command that may appear questionable or unfamiliar to the pilot.

It is thus desirable to provide electronic devices facilitating the entry of handwritten pilot data into flight deck systems, which overcome one or more of the foregoing drawbacks associated with conventional notepad-based transcription practices. Ideally, such devices would reduce pilot workload, provide additional safeguards ensuring the accurate entry of navigational commands into flight deck systems, and/or offer other enhanced functionalities not currently provided by notepad-based transcription practices. It would further be desirable to provide program products and methods also providing such benefits or otherwise supporting the operation of such devices. Other desirable features and characteristics of the present invention will become apparent from the subsequent Detailed Description and the appended Claims, taken in conjunction with the accompanying Drawings and the foregoing Background.

BRIEF SUMMARY

Embodiments of touchscreen-enabled electronic devices (referred to as "digital pilot notepads") are provided, which can perform a number of functions facilitating the entry of handwritten pilot data into one or more flight deck systems of an aircraft. In one embodiment, the digital pilot notepad includes an avionics interface over which alphanumeric input data is transmitted to a flight deck system, a touchscreen device, and a controller operably coupled to the avionics interface and to the touchscreen device. The controller is configured to digitally capture a handwritten pilot note written on the touchscreen device by a pilot, convert the handwritten pilot note to alphanumeric input data in a format compatible with the flight deck system, and subsequently submit the alphanumeric input data to the flight deck system over the avionics interface.

Methods carried-out by a digital pilot notepad are further provided. In one embodiment, the method includes the step or process of receiving, at a touchscreen device of the digital pilot notepad, handwritten command data provided by a pilot and describing a navigational command implemented utilizing a flight deck system. At a controller of the digital pilot notepad, the handwritten command data is converted into alphanumeric command data in a format suitable for submission to the flight deck system. The alphanumeric command data is then submitted to the flight deck system via an avionics interface of the digital pilot notepad, which can communicate with the flight deck system over a physical or wireless connection.

Embodiments of program product are still further provided. In one embodiment, the program product includes digital pilot notepad program adapted to: (i) receive, at a touchscreen device of the digital pilot notepad, handwritten command data provided by a pilot and describing a navigational command implemented utilizing a flight deck system; (ii) convert, at a controller of the digital pilot notepad, the handwritten command data into alphanumeric command data in a format suitable for submission to the flight deck system; and (iii) submit, via an avionics interface of the digital pilot notepad, the alphanumeric command data to the flight deck system. The program product further includes non-transitory, computer-readable media bearing the digital pilot notepad program.

BRIEF DESCRIPTION OF THE DRAWINGS

At least one example of the present invention will hereinafter be described in conjunction with the following figures, wherein like numerals denote like elements, and.

DETAILED DESCRIPTION

Figure 1:
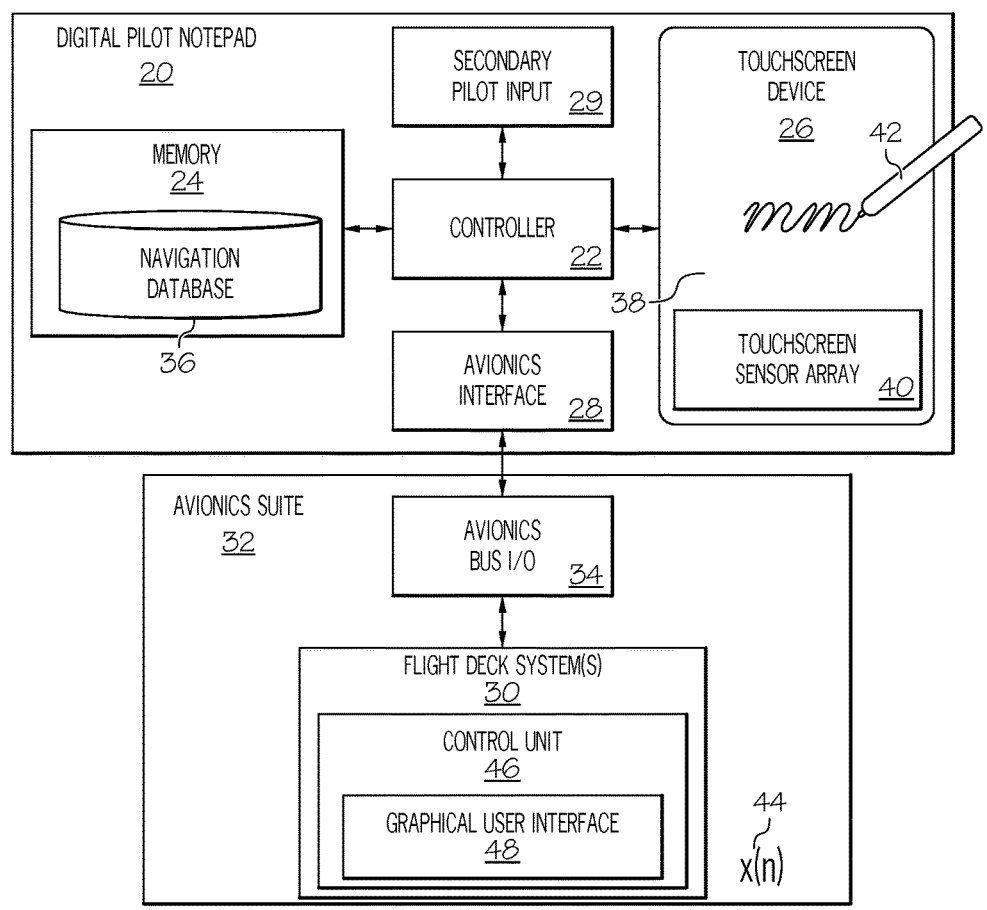
FIG. 1 is a block diagram of digital pilot notepad and an avionics suite including at least one flight deck system into which handwritten pilot data can be entered utilizing the digital pilot notepad, as illustrated in accordance with an exemplary embodiment of the present invention.

The following Detailed Description is merely exemplary in nature and is not intended to limit the invention or the application and uses of the invention. Furthermore, there is no intention to be bound by any theory presented in the preceding Background or the following Detailed Description. As appearing herein, the term "pilot" encompasses all members of an aircrew.

The following describes embodiments of an electronic device (referred to herein as a "digital pilot notepad") enabling a pilot to input handwritten command data into and otherwise interface with flight deck systems onboard an aircraft. During operation, the pilot notepad digitally captures handwritten pilot data or "notes" entered into the notepad and converts handwritten pilot notes to alphanumeric data in a format suitable for submission to a flight deck system. The digital pilot notepad may extract and convert any type of alphanumeric data or information from the handwritten pilot notes that can be usefully entered into a flight deck system of an aircraft. This notwithstanding, the digital pilot notepad may be particularly useful in the extraction and conversion of handwritten navigational command data from the handwritten pilot notes; the term "command data" referring to data entered or programmed into the flight deck system of an aircraft specifying the parameters of a navigational procedure performed by the aircraft. In many cases, the navigational command data will contain multiple parts or "elements," which are entered into separate data fields of a Graphic User Interface (GUI) screen associated with the flight deck system. The digital pilot notepad can separate the command data into its base elements and, when instructed by a pilot, automatically populate the separate data fields of the GUI screen with the appropriate command elements. In so doing, the digital pilot notepad provides an intuitive, handwriting-based pilot interface that can streamline handwritten data entry into the flight deck systems to favorably reduce pilot workload and minimize pilot heads-down time.

In addition to streamlining flight deck system data entry, embodiments of the digital pilot notepad can perform other functions promoting data integrity and rapid pilot comprehension of proposed navigational commands. Such additional functions can include the performance of a data validity check prior to submission of alphanumeric command data to the flight deck systems. During the data validity check, the digital pilot notepad can search a navigational database stored on the notepad or elsewhere for waypoint identifiers contained within the alphanumeric command data. If duplicate waypoint identifiers are found in the navigational database, or if a corresponding waypoint identifier is not located in the navigational database, the digital pilot notepad can generate an appropriate notification message on the notepad and await additional input from the pilot clarifying the questionable waypoint input. In further embodiments, the digital pilot notepad can produce supplemental graphics on the notepad visually depicting the navigational command (e.g., a prescribed taxi route) after converting the handwritten command data into alphanumeric command data and prior to submission of the alphanumeric command data to the flight deck system. Embodiments of the digital pilot notepad can perform any or all of the above-described function along with any number of additional functions, as described more fully below. An exemplary embodiment of the digital pilot notepad will now be described in conjunction with FIG. 1.

General Example of the Digital Pilot Notepad

FIG. 1 is a block diagram of a digital pilot notepad 20, as illustrated in accordance with an exemplary embodiment of the present invention. Digital pilot notepad 20 includes a controller 22, a memory 24, and a touchscreen device 26. Digital pilot notepad 20 also includes an avionics interface 28, which enables notepad 20 to transmit data to and possibly receive data from at least one flight deck system 30 included within the avionics suite 32 of an aircraft. Specifically, during operation of notepad 20, controller 22 can submit alphanumeric data to one or more flight deck systems 30 by placing the alphanumeric data on an avionics data bus via an Input/Output (I/O) 34. The datalink between avionics interface 28 and avionics bus I/O 34 can be physical or wireless, depending upon the particular manner in which notepad 20 is implemented. In this regard, digital pilot notepad 20 may be mounted within the aircraft cockpit in a non-pilot-removable manner or, instead, may be a portable electronic device that can be freely carried into and out of the cockpit by the pilot. The various manners in which digital pilot notepad 20 can be implemented are discussed more fully below; first, however, each of the components included within notepad 20 is described in greater detail.

Addressing first controller 22 of digital pilot notepad 20, controller 22 can include any suitable number of individual microprocessors, microcontrollers, digital signal processors, programmed arrays, and other standard components known in the art. Controller 22 may include or cooperate with any number of software or firmware programs designed to carry out the various methods, process tasks, calculations, and control/display functions described herein. Controller 22 will typically execute an operating system stored in memory 24 when digital pilot notepad 20 is operational to assist the various programs executing on notepad 20 to access the hardware features thereof.

Memory 24 of digital pilot notepad 20 can include any number of volatile and/or non-volatile memory elements. In many embodiments, memory 24 will include a central processing unit register, a number of temporary storage areas, and a number of permanent storage areas. Memory 24 can also include one or more mass storage devices, such as magnetic hard disk drives, optical hard disk drives, flash memory drives, and the like. As schematically indicated in FIG. 1, memory 24 can store a navigation database (NDB) 36 containing waypoint information, such as waypoint identifiers; airport map information; runway information; and the like. Digital pilot notepad 20 may periodically update NDB 36 through avionics suite 32 by, for example, copying a navigational database included within a Flight Management System (FMS) of avionics suite 32 to internal memory 24 of notepad 20. In other embodiments, NDB 36 can be periodically updated by connecting digital pilot notepad 20 to a digital network, such as an open Content Delivery Network (CDN), the Internet, or any other digital network based upon Transmission Control Protocol (TCP)/Internet Protocol (IP) or other conventional protocols. In certain implementations, a pilot may subscribe to a global datacenter that, in turn, supports the functionality of digital pilot notepad 20 and provides periodic updates to NDB 36.

Touchscreen device 26 can be any device having a display and a sensor array capable of detecting handwritten input "drawn" across the display screen. Touchscreen device 26 includes a display screen 38 and a sensor array 40, which may be integrated into, disposed beneath, or otherwise suitable positioned within respect to display screen 38. Display screen 38 can be any image-generating device, such as a liquid crystal display. Sensor array 40 can comprise any number and type of sensors configured to register or detect input of handwritten characters, symbols, and the like "drawn" onto display screen 38. A non-exhaustive list of suitable sensor technologies that can be integrated into touchscreen device 26 includes acoustic, optical, and infrared touchscreen sensor arrays. As indicated in FIG. 1, a pilot will typically utilize a stylus 42 when entering handwritten data into touchscreen device 26, interacting with virtual widgets generated on display screen 38, or otherwise interacting with the GUI generated on touchscreen device 26. However, the possibility that a pilot may interact with touchscreen device 26 utilizing a different writing implement or a finger is not precluded.

In many embodiments, digital pilot notepad 20 may be equipped with other pilot input devices beyond touchscreen device 26. Such auxiliary pilot inputs are collectively identified as "secondary pilot input 29" in FIG. 1 and can include any combination of cursor control devices (e.g., mice, trackballs, and joysticks), keyboards or keypads, buttons, switches, microphones, cameras, knobs, the like. Secondary pilot input 29 can be utilized to provide pilot input data in concert with the handwritten pilot data received via touchscreen device 26. Secondary pilot input 29 can also provide an alternative means for entering alphanumeric data into digital pilot notepad 20 (albeit in a typed rather than handwritten form) should it become difficult to write legibly on touchscreen device 26 due to turbulence or for another reason.

As noted above, digital pilot notepad 20 may be implemented as a portable electronic device that can be freely carried into and out of the cockpit by a pilot, such as a tablet computer or Electronic Flight Bag (EFB) having touchscreen capabilities. In such embodiments, avionics interface 28 may include or assume the form of a wireless (e.g., radio frequency) transceiver capable of bidirectional communication with bus I/O 34, which may likewise include or assume the form of a compatible wireless transceiver. It may also be possible to physically connect digital pilot notepad 20 to bus I/O 34 utilizing a cable, dock, or other physical connection interface when notepad 20 assumes the form of a portable electronic device. In other embodiments, digital pilot notepad 20 may be standalone device that is mounted within the aircraft cockpit in a manner that, for all practical purposes, prevents pilot removal. In this case, digital pilot notepad 20 is preferably positioned at a location allowing the pilot to easily reach display screen 38 while operating the aircraft; e.g., digital pilot notepad 20 can be affixed to the yoke of an aircraft or mounted to a movable platform adjacent the pilot's seat. In such embodiments, digital pilot notepad 20 will often communicate with flight deck system 30 over a wired connection with avionics interface 28 including a hardwire connection and associated I/O pins, although the possibility that notepad 20 can wirelessly communicate with flight deck system 30 in such embodiments is not precluded. As a still further possibility, digital pilot notepad 20 can be implemented as "enhanced" version of a flight deck system control unit adapted to have touchscreen capabilities and perform the functions described herein. An example of digital pilot notepad 20 implemented as an enhanced Multi-Purpose Control Display Unit (MCDU) is described below in conjunction with FIG. 11.

As indicated in FIG. 1 by symbol 44, avionics suite 32 can include any number of flight deck display systems 30, which can receive alphanumeric input data from notepad 20. A non-exhaustive list of flight deck systems 30 that can be utilized in conjunction with digital pilot notepad 20 includes FMSs, Flight Director (FD) systems, maintenance systems, communication/navigation systems, radio systems, Central Maintenance Computers (CMCs), forward display control systems, and other avionic systems utilized to open and interact with navigational charts, to list but a few examples. Each flight deck system 30 can include a dedicated control unit 46; or, as will often be the case, multiple flight deck systems 30 can share a common control unit 46. In one embodiment, control unit 46 assumes the form of an MCDU utilized to enter navigational commands into an FMS and possibly other flight deck systems included within avionics suite 32. As further schematically illustrated in FIG. 1, a GUI screen or page 48 is selectively generated on the display of control unit 46. By common practice, a pilot utilizes a keypad provided on control unit 46 to type alphanumeric input data into GUI page 48 when programming a flight deck system 30 to perform a particular navigational procedure or command. As described below, digital pilot notepad 20 can streamline this data entry process by automatically submitting alphanumeric command data to the control unit 46 of a particular flight deck system 30. The alphanumeric command data may then appear on the screen of GUI 48, which the pilot may review and then enter into the flight deck system 30 utilizing control unit 46. An exemplary embodiment of a method that can be carried-out by digital pilot notepad 20 in generating such alphanumeric input data from a handwritten pilot note and then submitting the alphanumeric input data to a flight deck system will now be described in conjunction with FIG. 2.

Exemplary Method Carried-Out by the Digital Pilot Notepad

Figure 2:
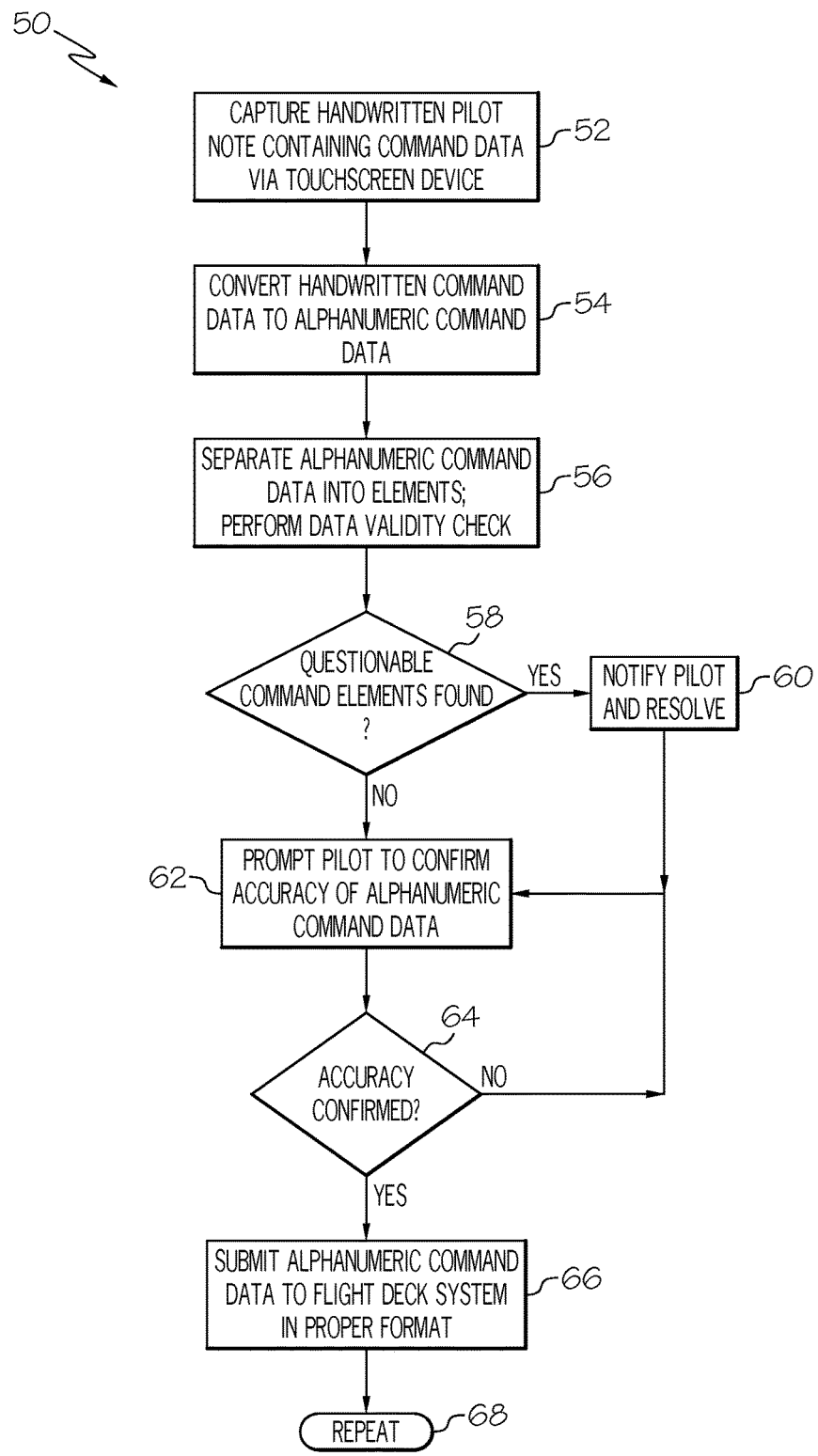
FIG. 2 is a flowchart setting-forth an exemplary process carried-out by the digital pilot notepad to facilitate the entry of command data contained within handwritten pilot notes into the flight deck system shown in FIG. 1, in accordance with a further exemplary embodiment of the present invention.

FIG. 2 is a flowchart setting-forth an exemplary method 50, which can be carried-out by controller 22 of digital pilot notepad 20 (FIG. 1) in accordance with an exemplary and non-limiting embodiment of the present invention. As shown in FIG. 2, method 50 includes a number of STEPS 52,

54, 56, 58, 60, 62, 64, 66, and 68, which may entail any number of individual sub-processes or combination of sub-processes depending upon the manner in which method 50 is implemented. The steps illustrated in FIG. 2 and described below are provided by way of example only; in alternative embodiments of method 50, additional steps may be performed, certain steps may be omitted, and/or the illustrated steps may be performed in alternative sequences.

Referring collectively to FIGS. 1 and 2, method 50 commences with STEP 52 during which a pilot enters handwritten data (a "pilot note") into digital pilot notepad 20 utilizing touchscreen device 26. During STEP 52, controller 22 of notepad 20 continually or periodically monitors for the occurrence of a screen capture event or trigger. The screen capture trigger can occur periodically after the elapse of a predetermined time period (e.g., a few seconds) following receipt of handwritten input via touchscreen device 26. Alternatively, the screen capture trigger can be initiated by pilot input received via touchscreen device 26 or secondary pilot input 29. For example, a virtual button or another widget can be produced on display screen 38, which the pilot can select after entering a handwritten note into touchscreen device 26. The virtual button can be identified as "CONVERT TO TEXT," "ENTER," or otherwise labeled. Upon occurrence of the screen capture trigger, controller 22 digitally captures the handwritten pilot note entered into touchscreen device 26.

After occurrence of the screen capture trigger, controller 22 converts the handwritten command data contained within the pilot note to alphanumeric command data (STEP 54, FIG. 2). This can be done utilizing Optical Character Recognition (OCR) or other another handwriting-to-text conversion technique. In certain cases, the pilot note may be written such that character-for-character transcription results in alphanumeric command input that, when properly formatted, is suitable for submission to the appropriate flight deck system. However, in many cases, the handwritten pilot note will contain extraneous information or data written in format not suitable for direct flight deck system submission. In this latter case, controller 22 may further translate the portion of the handwritten pilot note containing the navigational command data into an appropriate form for flight deck system entry. Such a translation process can entail converting handwritten terms, phrases, and names to corresponding NDB identifiers. For example, the names of waypoints, airports, and the like can be shortened to their corresponding NDB identifiers during the conversion process. As a first example, the handwritten airport name "Madrid Barajas International Airport" could be converted to the corresponding NDB identifier "LEMD" when converted into alphanumeric command data. As a second example, the handwritten phrase "PHOENIX VOR" could be translated to its corresponding NDB identifier "PXR," as appropriate for entry into a flight deck system interface. Digital pilot notepad 20 can perform such a translation process automatically or pursuant to pilot commands; e.g., the pilot can circle a particular word or phrase to initiate lookup of its corresponding NDB identifier or appropriate flight deck system entry form in certain embodiments. Such a translation process can also encompass converting shorthand symbols to corresponding alphanumeric text suitable for entry into a flight deck system. For example, the shorthand symbol "X" could be translated to the alphanumeric equivalent of "NO" during the conversion process as described below in conjunction with FIGS. 6-8.

Figure 8:
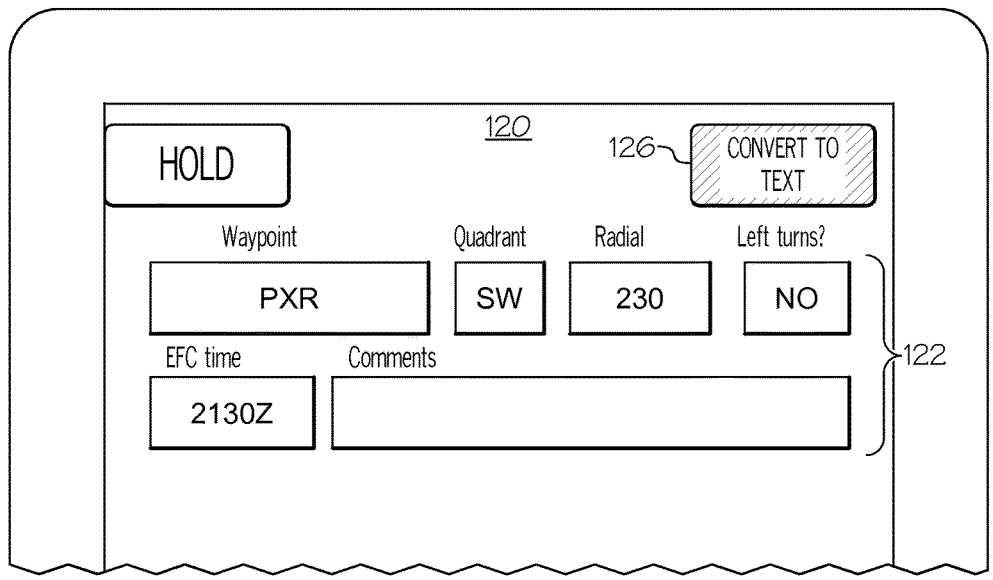
Figure 9:
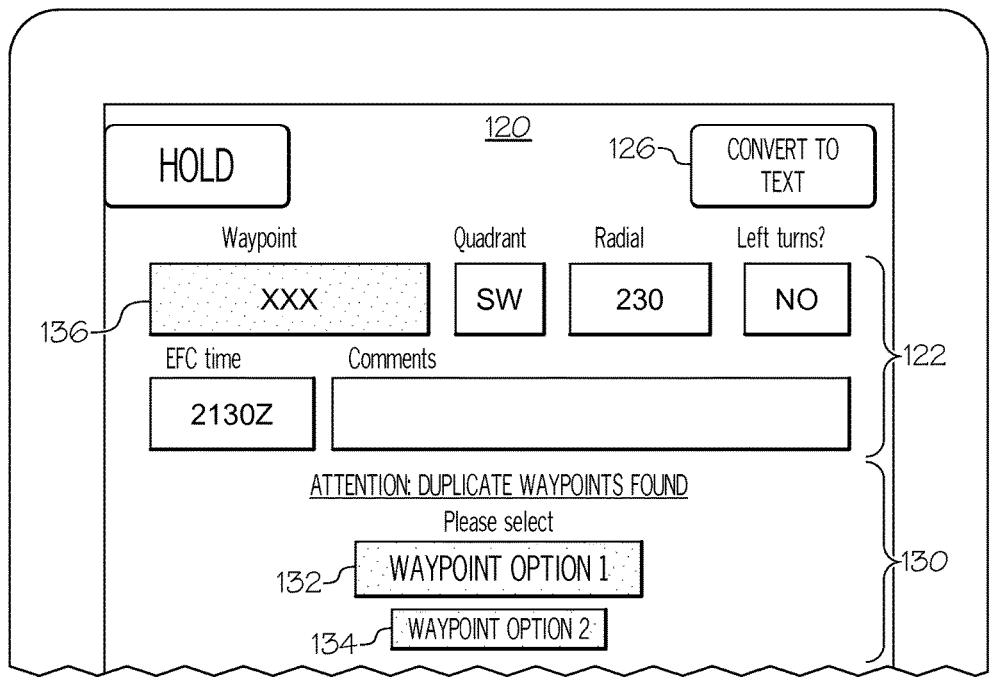
FIG. 9 illustrates a GUI page generated on the digital pilot notepad (partially shown) and including a duplicate waypoint notification message, as illustrated in accordance with another exemplary embodiment of the present invention.

Controller 22 can further separate an alphanumeric command data containing multiple parts or elements into its basic command elements during STEP 56 of exemplary method 50 (FIG. 2). This can be accomplished by automatically parsing the alphanumeric command data derived from the handwritten pilot note when the pilot note is provided in in freeform format (that is, as a non-segregated character string), as described below in conjunction with FIGS. 3-5. Alternatively, controller 22 can segregate the alphanumeric command data into its base command elements by prompting the pilot to enter the data elements into different data fields of a command template, as described below in conjunction with FIGS. 6-8. After separating the alphanumeric command data into a number of discrete command elements, a data validity check can be performed for all or for a subset (e.g., a certain type) of the command elements (STEP 56, FIG. 2). For example, during the data validity check, each command element can be scanned to ensure appropriate formatting. Additionally, any waypoint identifiers contained within the alphanumeric command data can be checked against a navigational database, such as NDB 36 (FIG. 1), to determine whether the waypoint identifier is located in the navigational database and, if so, whether duplicate waypoint identifiers exist. If any questionable command elements are found (STEP 58), the pilot may be notified and prompted to correct or clarify the questionable command element (STEP 60). For example, if duplicate waypoint identifiers were found in the navigational database, a corresponding notification message can be generated on touchscreen device 26 requesting pilot clarification. An example of such a duplicate waypoint notification message is shown in FIG. 9 and described below.

With continued reference to exemplary method 50 shown in FIG. 2, controller 22 of digital pilot notepad 20 next prompts a pilot confirm the accuracy of the alphanumeric command data prior to submission to the flight deck system (STEP 62). The alphanumeric command data can be displayed on display screen 38 of touchscreen device 26 (FIG. 1) along with a prompt (e.g., a virtual "SUBMIT" button) querying the pilot as to whether the displayed command data is correct. Digital pilot notepad 20 also present the pilot with a manner in which to correct any errant command data. For example, a pilot may be able to select a particular command element to summon a data field into which corrected data can be written. Alternatively, a pilot may be able to write the corrected entry above the errant command element after circling or crossing-out the errant command element on touchscreen display 38.

After the pilot confirms the accuracy of the alphanumeric command data (STEP 64), the alphanumeric command data is submitted to the appropriate flight deck system in a suitable format (STEP 66). In many cases, the alphanumeric command data will be submitted to the FMS at STEP 66; however, the particular type of flight deck system to which the alphanumeric command data is submitted will vary in conjunction with the type of command data. Similarly, the compatible format can vary amongst flight deck systems, but will typically be a widely-known standardized format for placing data on an avionic data bus, such as Aeronautical Radio Inc. (ARINC) 429. Afterwards, controller 22 may advance to STEP 68, and method 50 may repeat. To complete execution of the desired navigational command or procedure, a pilot may then refer to the flight deck system interface screen as now populated with the alphanumeric command data forwarded by digital pilot notepad 20. Providing the alphanumeric command data appears correct, the pilot selects the appropriate option to execute the navigational command.

In the above-described manner, the digital pilot notepad 20 facilitates the entry of handwritten pilot data into one or more flight deck systems of an aircraft. Advantageously, the foregoing process eliminates pilot reliance on a non-electronic notepad when programming navigational commands into a flight deck system. By streamlining the entry of navigational command data in this manner, pilot workload is reduced and heads-down time is minimized. Concurrently, the digital pilot notepad introduces one or more additional data validity checks into the data entry process thus providing a high level of data integrity. As a point of emphasis, the particular GUI presented on digital pilot notepad 20 and particular manner in which a pilot inputs handwritten data into digital pilot notepad 20 will vary amongst embodiments. By way of non-limiting illustration, the following will describe two exemplary embodiments of the digital pilot notepad GUI wherein handwritten pilot notes containing navigational command data are received in two different manners, namely, utilizing a freeform format (described below in conjunction with FIGS. 3-5) and utilizing a navigation-specific template (described below in conjunction with FIGS. 6-8).

Figure 3:
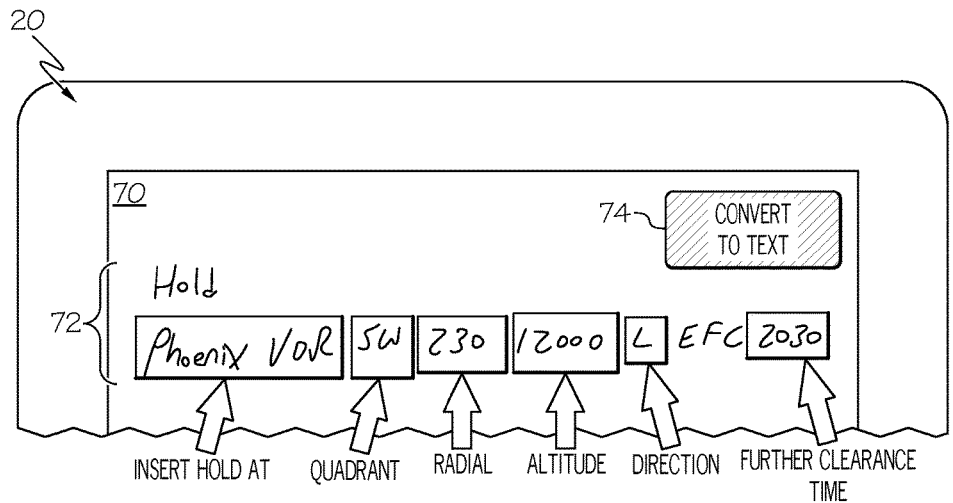
FIGS. 3 and 4 illustrate a Graphic User Interface (GUI) screen or page generated on the digital pilot notepad (partially shown) for receiving handwritten command data in a freeform format, as illustrated in accordance with a still further exemplary embodiment of the present invention.

Examples of Entry and Processing of Handwritten Pilot Notes Provided in Freeform FIG. 3 illustrates a portion of an image or GUI page 70, which may be generated on display screen 38 of digital pilot notepad 20 (FIG. 1) in an embodiment wherein handwritten pilot notes are entered into notepad 20 in a freeform format. In this exemplary scenario, the pilot has written a pilot note 72 onto screen 38 of notepad 20. Handwritten pilot note 72 sets-forth a particular navigational command (specifically, a hold pattern command) and will consequently be referred hereafter as "handwritten command data 72." Handwritten command data 72 includes a first or "command" line in which the pilot has written the word "HOLD" to indicate the command type. On the second line of pilot command 72, the pilot has handwritten the details or data elements of the command. Handwritten pilot command 72 is entered in a freeform format; that is, as a non-segregated character string containing multiple command elements. In converting handwritten pilot command 72 into its alphanumeric equivalent, controller 22 of digital pilot notepad may parse command 72 into its base command elements. For purposes of explanation, a series of labeled boxes are shown in FIG. 3 to identify the command elements of the HOLD command. The labeled boxes would not typically be displayed on page 70, as generated on display screen 38 of notepad 20. The command elements of the HOLD command set-out by pilot command 72 include an INSERT HOLD AT element, a QUADRANT element, a RADIAL element, a DIRECTION element, and an EXPECT FURTHER CLEARANCE TIME or "EFC" command element. The particular source from which the pilot receives HOLD command is largely inconsequential in the context of the present invention. However, to help establish an exemplary context, the pilot may write command 72 after receiving a navigational communication or clearance from ATC. The pilot may write command 72 onto notepad 20 after the communication exchange with ATC:

ATC: "Flight 5214, I have a hold clearance, advise when ready to copy."

Pilot: "Ready to copy, Flight 5214."

ATC: "Flight 5214, hold SW of XYZ on the 230 radial, maintain 12000, expect further clearance at 2030Z, current time is 1940Z."

Pilot: Repeats the clearance and writes down the following command on the notepad: HOLD PHX VOR SW 230 1200 L EFC 1200.

With continued reference to FIG. 3, page 70 is further generated to include a widget that can be selected by the pilot to trigger conversion of the handwritten command data to alphanumeric text. In the illustrated example, this widget is provided in the form of a virtual button 74, which appears in the upper right corner of page 70 and which is labeled "CONVERT TO TEXT." When virtual button 74 is selected by a pilot, alphanumeric command data is derived from navigational handwritten command data 72 in the manner described below in conjunction with FIG. 4.

Figure 4:
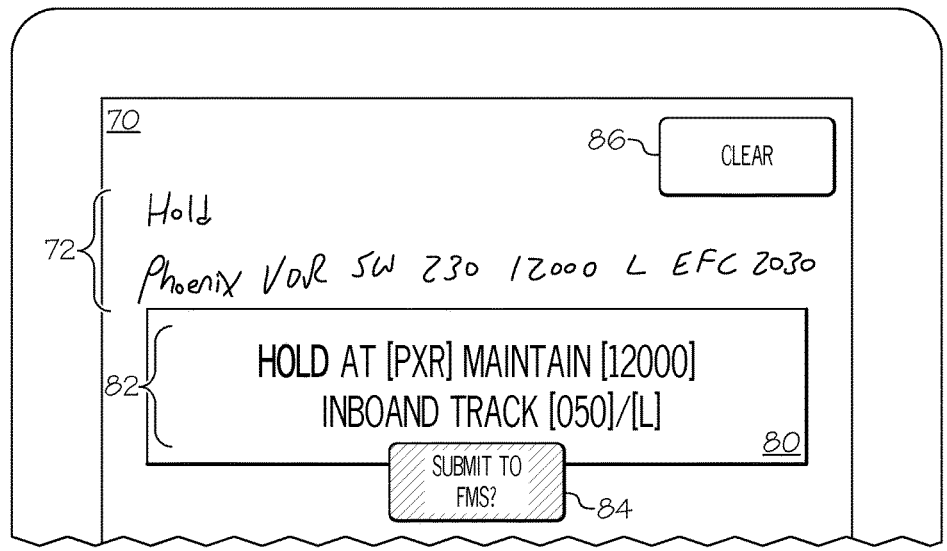

FIG. 4 illustrates GUI page 70 after selection of the virtual CONVERT TO TEXT button 74 shown in FIG. 3. As can be seen, page 70 has been updated to include a window 80 containing alphanumeric command data 82 derived from handwritten command data 72. In this example, page 70 continues to display handwritten command data 72 above alphanumeric command data 82; however, this need not be the case in all embodiments. It will be noted that alphanumeric command data 82 is not a character-for-character or verbatim transcription of handwritten command data 72. Instead, only the necessary information has been extracted from handwritten command data 72. Additionally, the written phrase "PHOENIX VOR" has been recognized as "PXR." Such recognition and translation of written phrases into a form suitable for entry into the flight deck systems can be accomplished by determining the type of navigational command at issue, which can be derived from the first line of handwritten command data 82. Additionally, information regarding the current status of the aircraft (e.g., current aircraft position, phase of flight, flight plan, and so on) known to digital pilot notepad 20 or retrieved by querying the appropriate flight deck systems 30 can also be leveraged in translating written phrases into the appropriate flight deck system entries.

If the data appearing in window 80 is correct, the pilot selects virtual button 84 generated near a lower portion of window 80 shown in FIG. 4. Otherwise, the pilot can clear all data by selecting virtual button 86 appearing in the upper right corner of GUI page 70. In response to pilot selection of virtual button 84, controller 22 submits alphanumeric command data 82 to the appropriate flight deck system. In the instant example wherein alphanumeric command data 82 specifies or defines a HOLD command, controller 22 of notepad 20 will typically forward command data 82 to the interface of an FMS. In many cases, the FMS (or other flight deck system) interface will include a screen on which multiple data fields are generated. Traditionally, a pilot enters command elements to the corresponding data fields utilizing, for example, an alphanumeric keypad located on the FMS interface. However, in the case of notepad 20, the multiple data fields can be automatically populated or "filled in" with the corresponding command elements, as described below in conjunction with FIG. 5.

Figure 5:
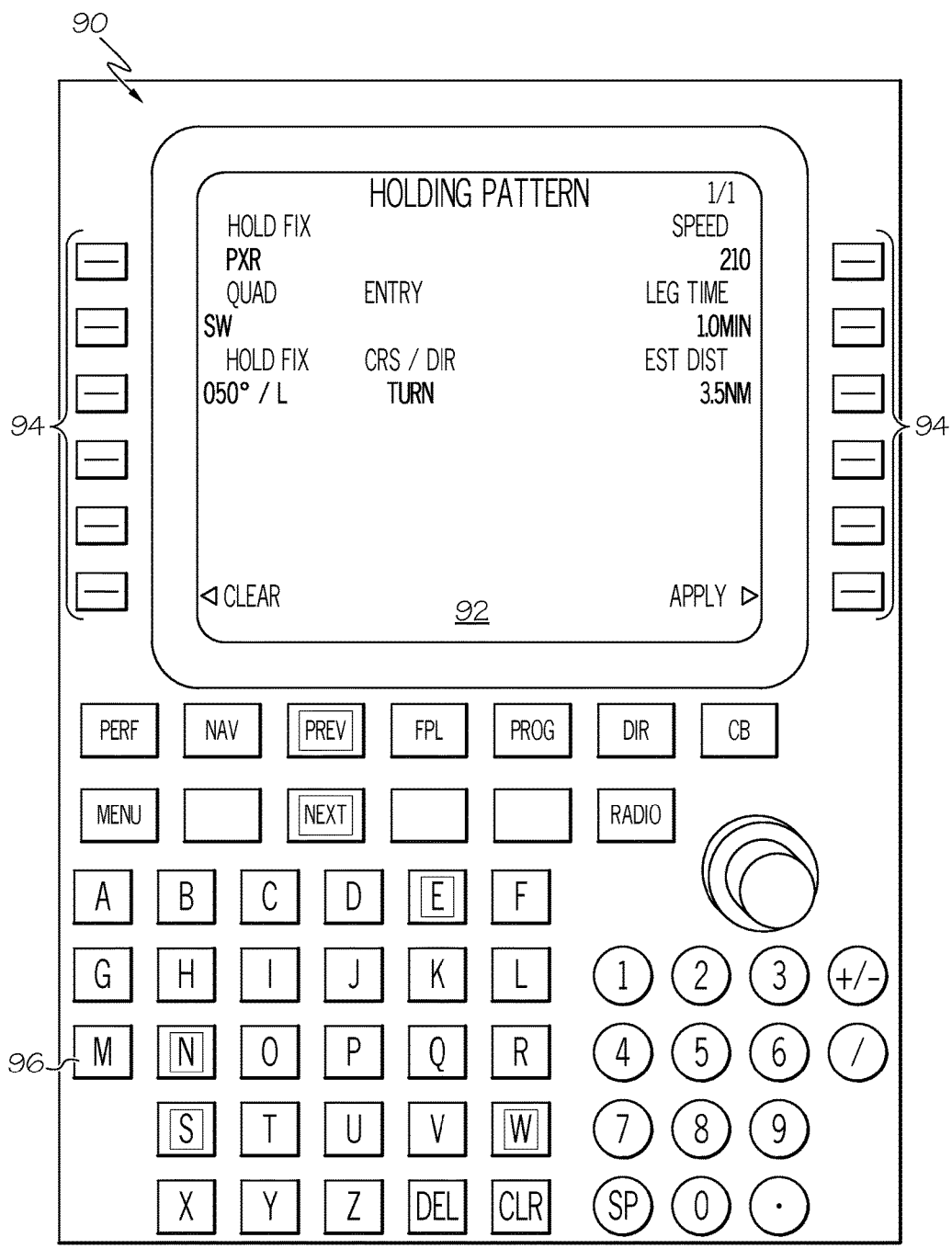
FIG. 5 illustrates a flight deck system GUI including multiple data fields, which have been automatically populated by the alphanumeric command data submitted to the flight deck system by the digital pilot notepad.

FIG. 5 illustrates an MCDU 90 that may serve as the interface for an FMS included within avionics suite 32 (FIG. 1). MCDU 90 includes a display screen 92, a number of command line buttons 94 arranged in two columns on opposing sides of display screen 92, and an alphanumeric keypad 96 beneath screen 92. The left side of display screen 92 includes first, second, and third command lines or data entry fields entitled "HOLD FIX," "QUAD ENTRY," and "INBD CRS/DIR," respectively. The foregoing data entry fields have been automatically been populated with the alphanumeric command data shown in FIG. 4 pursuant to alphanumeric data submission by digital pilot notepad 20. Thus, the pilot need only review display screen 92 to ensure the accuracy of the alphanumeric command data, as provisionally entered into MCDU 90; and then press the button 94 correspond to "APPLY" option appearing in the lower right corner of screen 92 to confirm entry of the hold pattern navigational command. This should be contrasted with non-electronic (pencil and paper) notepad-based transcription practices, which would generally necessitate that a pilot manually types the command data into MCDU 90 utilizing alphanumeric keypad 96, while repeatedly glancing between display screen 92 and the pilot's non-electronic notepad.

Examples of Template-Based Entry and Processing of Handwritten Pilot Notes

In further embodiments wherein a handwritten pilot note sets-forth a navigational command or procedure having multiple parts or "command elements," controller 22 of digital pilot notepad 20 (FIG. 1) can present the pilot with a template having multiple fields into which the individual command elements are written by the pilot. In this case, a number of templates can be stored in memory 24 of digital pilot notepad 20, selectively recalled by controller 22, and displayed as a GUI page on touchscreen device 26 as needed. During operation of digital pilot notepad 20, controller 22 can identify the appropriate navigational template to display on touchscreen device 26 by receiving pilot data selecting a particular command type from a plurality of command types. The pilot selection data can be received by presenting the pilot with template selection interface, which can include one or more drop down menus, hierarchical menu structures, and the like that can be easily navigated by a pilot to select the desired command type. The usage of such a command-specific template thus provides a clear segregation of the command elements and avoids the need to parse a freeform character string. The accuracy and speed with which controller 22 of notepad 20 derives alphanumeric command data from the handwritten command data can be improved as a result. An exemplary embodiment of such a template-based entry process will now be described in conjunction with FIGS. 6-8.

Figure 6:
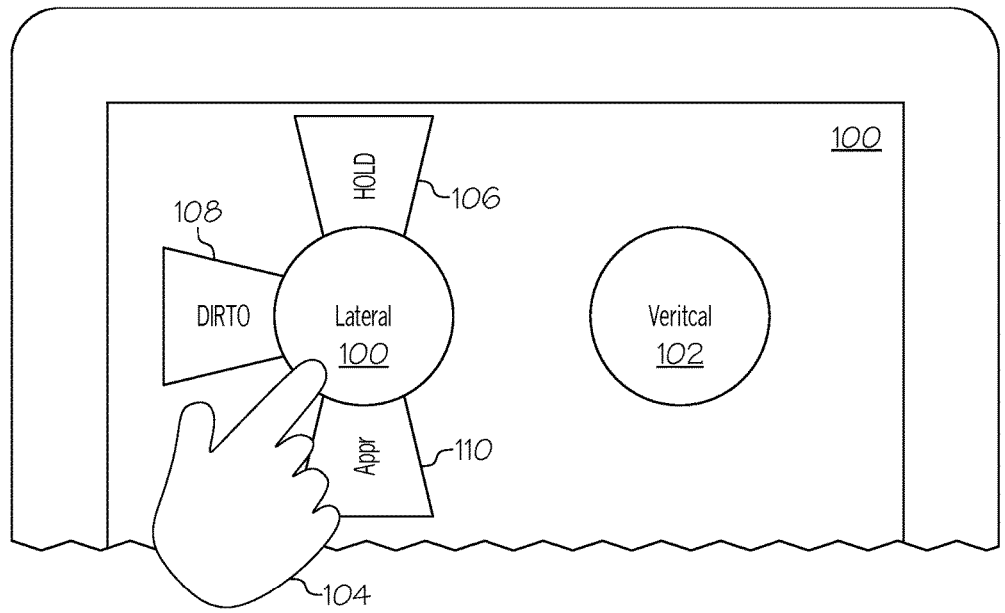
FIGS. 6-8 illustrate a series of GUI pages generated on the digital pilot notepad (partially shown) for receiving handwritten command data entered into a command-specific template, as illustrated in accordance with a yet further exemplary embodiment of the present invention.

FIG. 6 illustrates a GUI page 100, which may be generated on display screen 38 of digital pilot notepad 20 (FIG. 1) in an embodiment wherein handwritten pilot notes are entered into a command-specific template. In this case, data is first received from a pilot specifying the particular type of navigational command for which data is to be entered. In this particular example, the pilot is presented with a top level menu including two virtual buttons 100 and 102. Button 100 is labeled as "LATERAL" and, when selected, summons selections corresponding to navigational commands belonging to a LATERAL category or subgrouping. For example, as indicated in FIG. 6 by touch symbol 104, the pilot may select button 100 to summon three additional buttons 106, 108, and 110. Buttons 106, 108, and 110 correspond to hold pattern (identified as "HOLD"), direct to (identified as "DIRTO"), and approach (identified as "APPR") commands, respectively. Similarly, a subgrouping of buttons can be summoned when the right top level button 102 (labeled as "VERTICAL") is selected. Navigational commands that may be included in the vertical category or subgrouping can include landing, takeoff, and flight level change (e.g., in-trail) commands. In further embodiments, the navigational command templates can be organized utilizing a different approach. For example, in another possible implementation, the navigational commands and their corresponding templates could be organized by phases of flight, such as taxi, climb cruise, dissent, arrival, approach, and so on.

Figure 7:
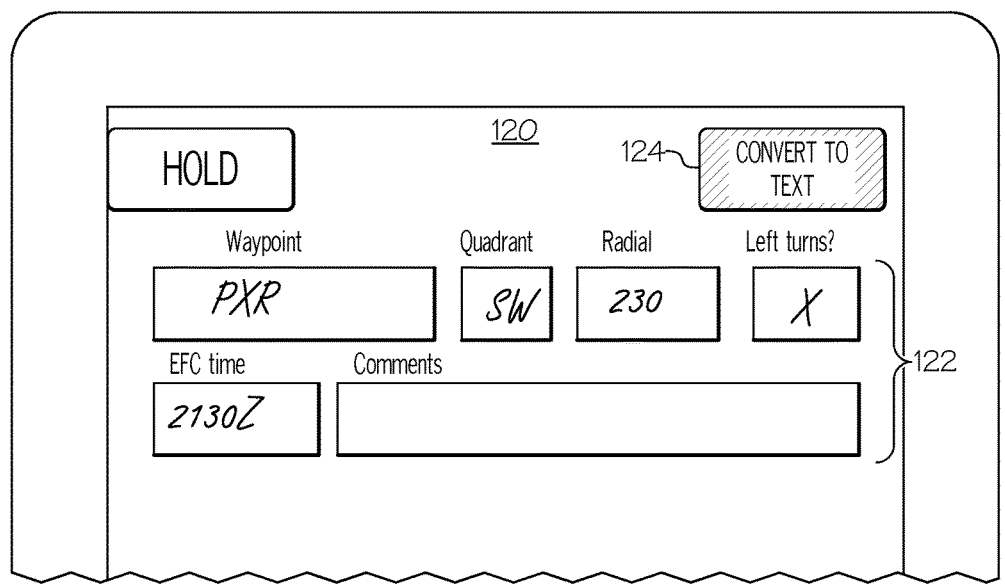

FIG. 7 illustrates a GUI page 120 that may be generated on display screen 38 of digital pilot notepad 20 (FIG. 1) after a pilot has selected the virtual button 106 corresponding to a hold pattern command. As can be seen, page 120 includes a HOLD template including a number of data fields 122. In this case, the data fields include WAYPOINT, QUADRANT, RAIDAL, and EFC Time fields, as well as fields for indicating whether left turns are required and for entering any comments or notes regarding the command. A pilot may thus utilize touchscreen device 26 to handwrite the appropriate entries in the data fields, as shown in FIG. 7. Afterwards, the pilot selects the CONVERT TO TEXT button 124 shown in the top right corner of page 120. Controller 22 of digital pilot notepad 20 then coverts the handwritten input into corresponding alphanumeric text, as generally shown in FIG. 8. As was previously the case, controller 22 can translate terms, phrases, and names to the corresponding NDB waypoint identifiers when converting the handwritten pilot input to alphanumeric text. Additionally, the digital pilot notepad can translate shorthand symbols to sequences of alphanumeric text. This may be appreciated by comparing the "LEFT TURNS?" data field in FIGS. 7 and 8 wherein controller 22 has translated the shorthand symbol "X" symbol to the alphanumeric text equivalent of "NO." In further embodiments, other shorthand symbols and corresponding alphanumeric text equivalent can be established; e.g., a checkmark symbol can correspond to the text equivalent of "YES." After the handwritten command data has been converted to alphanumeric command data, the pilot may then review converted alphanumeric command data as displayed on GUI page 120 for accuracy. If determining that the data is accurate, the pilot may select the ENTER button 126 to forward the alphanumeric command data to the appropriate flight deck system in the previously-described manner.

Examples of Data Validity Check Performed by the Digital Pilot Notepad

Figure 10:
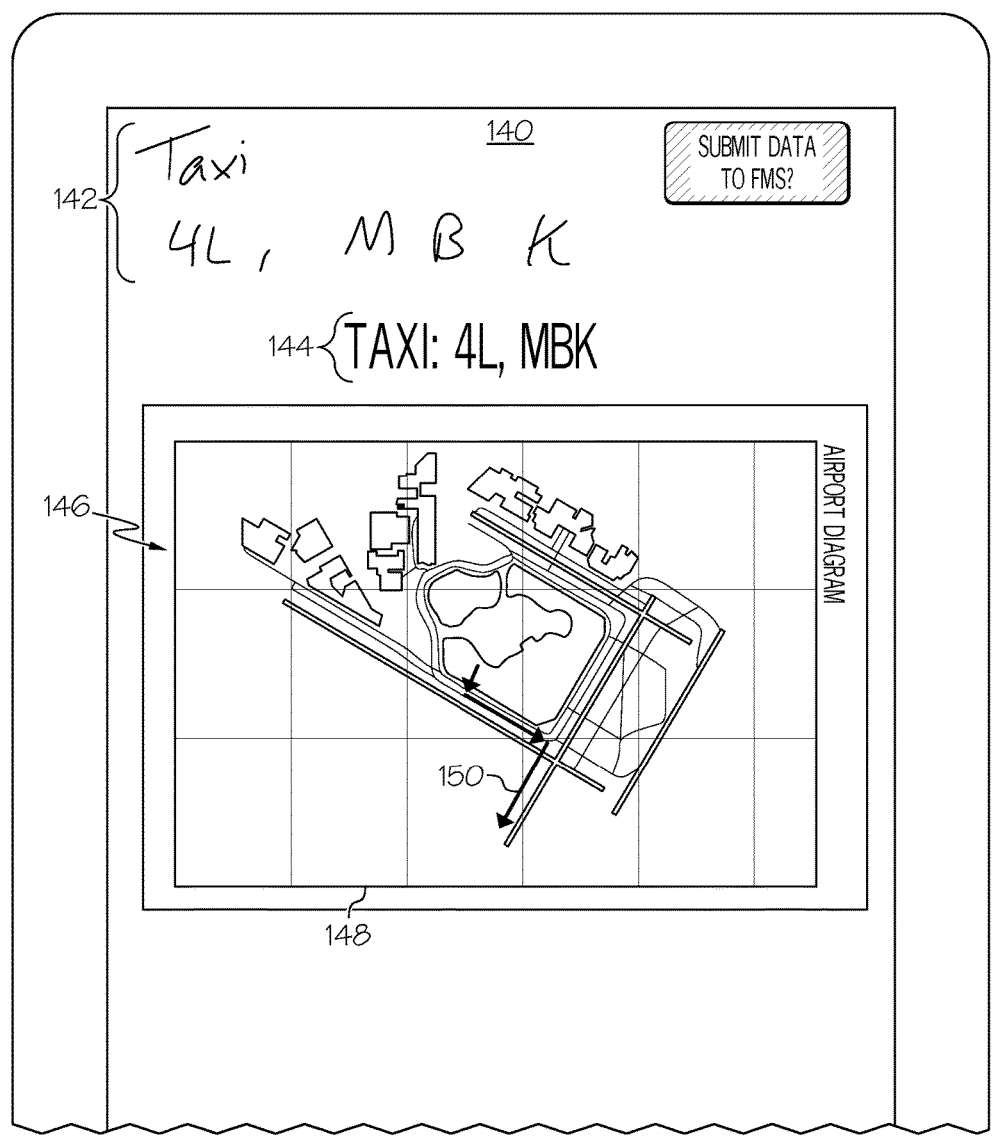
FIG. 10 illustrates a GUI page generated on the digital pilot notepad (partially shown) and including graphics visually denoting a navigational procedure (e.g., a taxi route) specified by the alphanumeric command data, as illustrated in accordance with an exemplary embodiment of the present invention.

As noted above, controller 22 of digital pilot notepad 20 (FIG. 1) can perform a data validity check of the alphanumeric command data extracted from the handwritten pilot note. If any questionable command elements are found (STEP 58), the pilot may be notified and prompted to correct or clarify the questionable command element (STEP 60). For example, if duplicate waypoint identifiers were found in the navigational database, a corresponding notification message can be generated on touchscreen device 26 soliciting pilot clarification. Consider, for example, FIG. 9 further illustrating an visual notification 130 that can be generated on GUI page 120 previously described in conjunction with FIGS. 7 and 8. Visual notification 130 includes a text message indicating the pilot that duplicate waypoint entries were located when performing the navigational database search utilizing, for example, NDB 36 (FIG. 1). Additionally, virtual buttons 132 and 134 are presented with each button representing a different waypoint entry. In this case, visual emphasis is placed on the first listed button 132 (e.g., by generating button 132 to have an enlarged size, a different, etc.) to indicate that the waypoint identifier represented by button 132 is identified as having the highest probability of being correct based upon, for example, the current location of the aircraft with respect to the waypoint location. Concurrent with the generation of visual notification 130, selection of CONVERT TO TEXT button 126 may be prevented as may be indicating by shading button 126 gray or another muted color. Additionally, the background of the data field into which the questionable waypoint identifier was entered may be highlighted in a striking color, such as amber, as indicated in FIG. 10 at 136. After a pilot selects one of buttons 132 and 134, the CONVERT TO TEXT button 126 may again become selectable, and method 50 (FIG. 2) can proceed as described above.

Example of Supplemental Graphics Generated on the Digital Pilot Notepad Depicting a Navigational Command Embodiments of digital pilot notepad 20 (FIG. 1) can produce supplemental graphics on touchscreen device 26 visually depicting the details of a navigational command prior to entry of the command into a flight deck system. Further emphasizing this point, FIG. 10 illustrates a GUI page 140 that may be generated on display screen 38 of digital pilot notepad 20 (FIG. 1) in accordance with a still further exemplary embodiment. As before, a pilot has entered a handwritten pilot note 140 containing command data, which has been converted to alphanumeric command data 142. However, in this particular example, the command data sets-out the parameters or details of a taxi route. Concurrent with generating alphanumeric command data 142, controller 22 has further produced a supplemental graphics 146 on GUI page 140. Supplemental graphics 146 include an airport map 148 and arrow symbols 150, which are overlaid on map 148 to depict the taxi route prescribed by alphanumeric command data 142. In this manner, supplemental graphics 148 visually depicting the navigational procedure (here, taxi route) called-for by command data 142. Supplemental graphics 148 thus help to increase pilot situational awareness and help the pilot rapidly build a mental model of the command prior to submission of alphanumeric command data 142 to the flight deck system and execution of the navigational command.

Example of Digital Pilot Notepad Implemented as an Enhanced Flight Deck System

In many embodiments, digital pilot notepad 20 will assume the form of a standalone device. In this case, digital pilot notepad 20 can be a pilot-portable electronic device, such as tablet or EFB having touchscreen capabilities, which communicates with the flight deck system(s) over a physical or wireless connection. Alternatively, and as described above, digital pilot notepad 20 can be standalone device that is mounted in the aircraft cockpit in a non-pilot-removable manner. As a still further possibility, digital pilot notepad 20 can assume the form of an enhanced flight deck system interface. The flight deck system interface may be similar to conventional interfaces and capable of performing traditional data entry functions. However, when implemented as a digital pilot notepad, the flight deck system may further be equipped with touchscreen capabilities and the ability to receive, recognize, and convert handwritten pilot navigational commands in the above-described manner. To further illustrate this point, an example of a digital pilot notepad in the form of an enhanced MCDU is described below in conjunction with FIG. 11.

Figure 11:
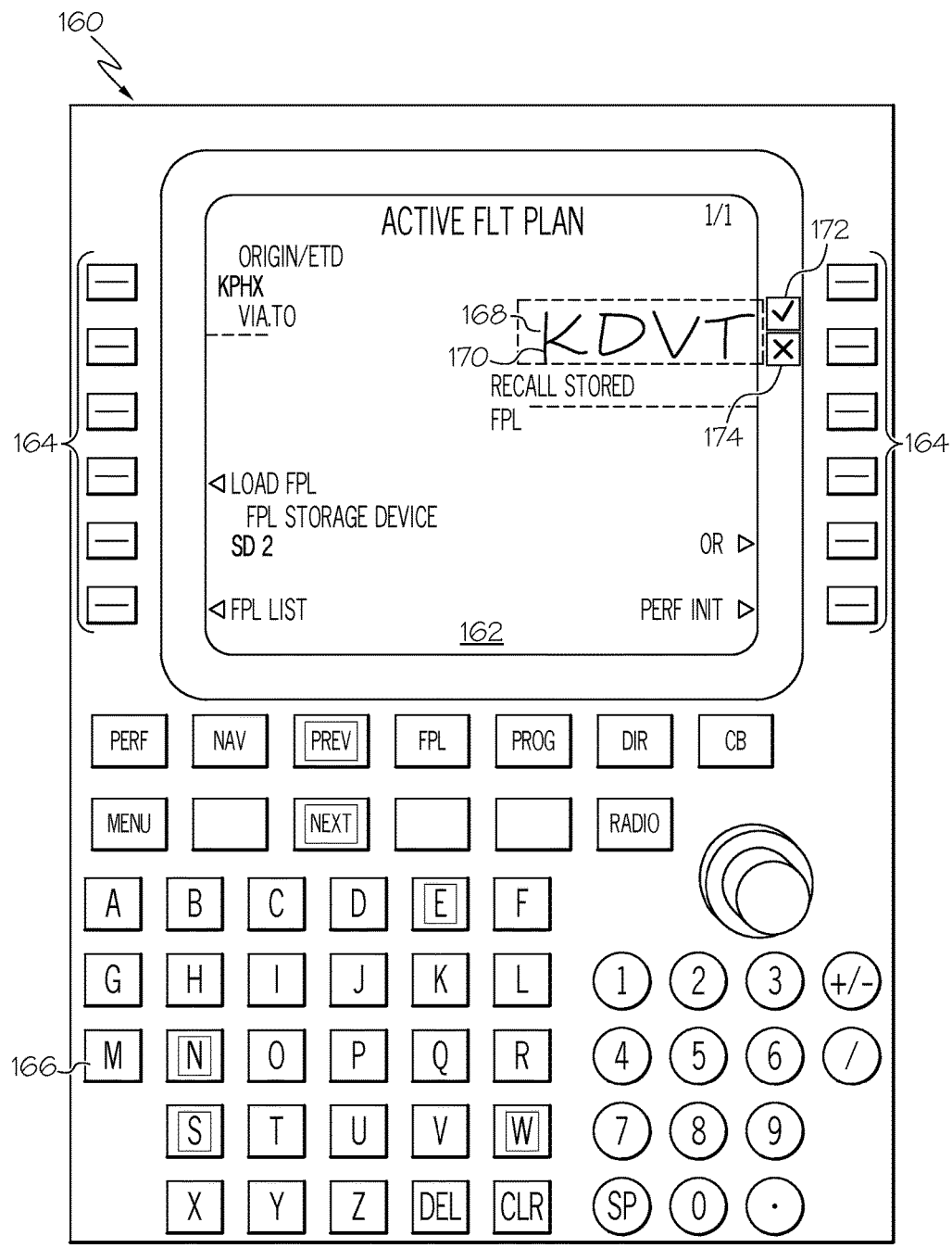
FIG. 11 illustrates a digital pilot notepad implemented as an enhanced Multi-Purpose Control Display Unit having touchscreen capabilities, as illustrated in accordance with a still further exemplary embodiment of the present invention.

FIG. 11 illustrates a digital pilot notepad implemented in the form of an enhanced or modified MCDU 160. As does MCDU 90 described above in conjunction with FIG. 5, MCDU 160 includes a display screen 162, a number of command line buttons 164 arranged in two columns on opposing sides of screen 162, and an alphanumeric keypad 166 beneath screen 162. As before, MCDU 160 allows alphanumeric input data to be entered by a pilot into one or more flight deck systems, such as flight deck systems 30 shown in FIG. 1. However, in this case, MCDU 160 is imparted with touchscreen capabilities, which are leveraged to enable a pilot to handwrite data directly on display screen 162 utilizing a stylus (e.g., stylus 42), a finger, or other writing implement. Thus, as indicated in FIG. 11, MCDU 90 can provide one or more data fields 168 into which a pilot can directly write input data, such as handwritten input data 170. Additional inputs 172, 174 (in this case, a physical or virtual confirmation button 172 and cancellation button 174) are further provided in adjacent data field 168. When the confirmation button 172 is selected by a pilot, the controller of MCDU 90 converts the handwritten data into an alphanumeric form suitable for submission to the FMS or other flight deck system for which MCDU 90 serves as a control unit. If the alphanumeric command data derived from the handwritten pilot input is correct, the pilot can then execute the command by selecting a virtual widget further generated on touchscreen 162 or by utilizing keypad 166.

CONCLUSION

The foregoing has thus provided allowing a pilot to input handwritten data into and otherwise interact with flight deck systems in an intuitive and intelligent manner. Embodiments of the digital pilot notepad can digitally capture handwritten notes entered into the notepad by a pilot, convert the pilot notes to alphanumeric input data compatible with a flight deck system, and then supply the flight deck system with the input data when so commanded by a pilot. Additionally, embodiments the digital pilot notepad can provide additional functions beyond streamlined data entry of handwritten data into the flight deck systems of an aircraft. For example, embodiments of the digital pilot notepad can further provide the translation of shorthand symbols to alphanumeric text. Embodiments of the digital pilot notepad can also divide the alphanumeric sequence of a navigational command into its elemental parts or parameters and, when instructed by a pilot, automatically populate the data fields of a flight deck system input screen with the appropriate parameters. In still further embodiments, the digital pilot notepad can identify or flag questionable parameters contained within a navigational command and present context-based suggestions to resolve any such questionable parameters. As a yet further possibility, embodiments of the digital pilot notepad can provide supplemental graphics visually depicting the details of a navigational command (e.g., a taxi route designed by a command) prior to entry of the command into a flight deck system to increase situational awareness and help the pilot rapidly build a mental model of the command. In so doing, the digital pilot notepads described herein provide an intuitive handwriting-based interface well-suited for usage in place of a traditional, non-electronic notepad or clipboard.

Although an exemplary embodiment of the present invention has been described above in the context of a fully-functioning computer system (e.g., digital pilot notepad 20 and MCDU 160 described above in conjunction with FIGS. 1-11), those skilled in the art will recognize that the mechanisms of the present invention are capable of being distributed as a program product (i.e., an Internet-disseminated EFB program or application) and, furthermore, that the teachings of the present invention apply to the program product regardless of the particular type of computer-readable media (e.g., floppy disc, hard drive, memory card, optical disc, etc.) employed to carry-out its distribution. In certain implementations, the flight deck display system may comprise graphical user interface (e.g., ARINC 661) components, which may include a user application definition file ("UADF"). As will be appreciated by one skilled in the art, such a UADF is loaded into the flight deck display system and defines the "look and feel" of the display, the menu structure hierarchy, and various other static components of the notepad GUI.

Finally, it will be noted that, while the Detail Description has focused on exemplary embodiments of the digital pilot notepad in the avionics or aircraft context, the foregoing teachings can also be applied to other contexts wherein it may be useful for a pilot to interact with a vehicle utilizing a handwriting-based interface. In this regard, additional embodiments of the digital pilot notepad and its associated program products and methods can be conceived for usage in conjunction with spacecraft and watercraft. For example, in the context of watercraft, embodiments of the digital pilot notepad can be usefully employed to facilitate entry of handwritten pilot instructions into one or more maritime bridge systems. By comparison, in the context of spacecraft, embodiments of the notepad can be utilized to enter of handwritten pilot instructions into one or more systems included in the mission control center of the spacecraft.

While at least one exemplary embodiment has been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. Various changes may be made in the function and arrangement of elements described in an exemplary embodiment without departing from the scope of the invention as set-forth in the appended Claims.

What is claimed is:

1. A digital pilot notepad utilized in conjunction with a flight deck system of an aircraft, the digital pilot notepad comprising:
an avionics interface over which alphanumeric input data is transmitted to the flight deck system;
a touchscreen device; and
a controller operably coupled to the avionics interface and to the touchscreen device, the controller configured to:
digitally capture a handwritten pilot note written on the touchscreen device by a pilot;
convert the handwritten pilot note to alphanumeric input data in a format compatible with the flight deck system; and
submit the alphanumeric input data to the flight deck system over the avionics interface.

2. The digital pilot notepad of claim 1 wherein, in converting the handwritten pilot note to alphanumeric input data, the controller is configured to generate alphanumeric command data from handwritten command data contained within the handwritten pilot note describing a navigational command implemented utilizing the flight deck system.

3. The digital pilot notepad of claim 2 wherein the controller is further configured to separate the alphanumeric command data into a plurality of command elements.

4. The digital pilot notepad of claim 3 wherein the flight deck system has a graphical user interface requiring entry of multiple command elements into separate data fields to implement the navigational command, and wherein the controller is further configured to automatically populate the separate data fields with corresponding ones of the plurality of command elements when submitting the alphanumeric command data to the flight deck system.

5. The digital pilot notepad of claim 3 wherein the controller is configured to separate the alphanumeric command data into the plurality of command elements by parsing a freeform character string entered into the touchscreen device by a pilot.

6. The digital pilot notepad of claim 3 wherein the controller is configured to separate the alphanumeric command data into the plurality of command elements by generating a command template page on the touchscreen device having multiple data fields into which the pilot writes different ones of the plurality of command elements.

7. The digital pilot notepad of claim 6 wherein the controller generates the command template page after receiving pilot selection data selecting a type of navigational command from a template selection interface generated on the touchscreen device.

8. The digital pilot notepad of claim 3 wherein the controller is further configured to:
determine when the plurality of command elements includes a waypoint identifier;
search a navigational database for the waypoint identifier; and
generate a visual alert on the touchscreen device if the navigational database contains more than or less than a single match for the waypoint identifier.

9. The digital pilot notepad of claim 8 wherein the controller is further configured to:
when the navigational database include duplicate waypoint entries matching the waypoint identifier, generate a graphic on the touchscreen device identifying the duplicate waypoint entries; and
receive pilot selection data selecting one of the duplicate waypoint entries prior to submitting the alphanumeric command data to the flight deck system.

10. The digital pilot notepad of claim 2 wherein the controller is further configured to produce supplemental graphics on the touchscreen device depicting the navigational command after generating the alphanumeric command data from handwritten command data.

11. The digital pilot notepad of claim 10 wherein the navigational command comprises a taxi route, and wherein the supplemental graphics comprise an airport map on which the taxi route is visually denoted.

12. The digital pilot notepad of claim 1 wherein the wherein the controller is further configured to:
display the alphanumeric input data on the touchscreen device after converting the handwritten pilot note to the alphanumeric input data; and
receive pilot confirmation verifying the accuracy of the alphanumeric input data prior to supplying the alphanumeric input data to the flight deck system.

13. The digital pilot notepad of claim 1 wherein the controller is further configured to:
recognize predetermined shorthand symbols within the handwritten input data; and
translate the predetermined shorthand symbols to corresponding alphanumeric text when converting the handwritten input data into alphanumeric input data.

14. A method carried-out by a digital pilot notepad including a touchscreen device, an avionics interface, and a controller coupled to the touchscreen device and to the avionics interface, the method comprising:
receiving, at the touchscreen device, handwritten command data provided by a pilot and describing a navigational command implemented utilizing a flight deck system;
converting, at the controller, the handwritten command data into alphanumeric command data in a format suitable for submission to the flight deck system; and
submitting, via the avionics interface, the alphanumeric command data to the flight deck system.

15. The method of claim 14 further comprising:
separating, at the controller, the alphanumeric command data into a plurality of command elements; and submitting, via the avionics interface, the alphanumeric command data such that separate data fields appearing on a graphical user interface of the flight deck system are automatically populated with corresponding ones of the plurality of command elements.

16. The method of claim 14 further comprising:
receiving, via the touchscreen device, the handwritten command data as a freeform character string; and
parsing, at the controller, the freeform character string to into a plurality of command elements when converting the handwritten command data into alphanumeric command data.

17. The method of claim 14 further comprising:
receiving, at the controller, pilot input identifying a command type prior to entry of the handwritten command data; and
generating, on the touchscreen device, a command template corresponding to the identified command type and having multiple data fields into which different portions of the handwritten command data are entered.

18. The method of claim 17 further comprising:
searching, utilizing the controller, a navigational database for waypoint identifiers matching any waypoint identifiers contained within the alphanumeric command data; and
generating a notification message on the touchscreen device if a waypoint identifier contained within the alphanumeric command data has less than or greater than one match in the navigational database.

19. The method of claim 17 further comprising generating, on the touchscreen device, a graphic depicting the navigational command after generating the alphanumeric command data from handwritten command data.

20. A non-transitory program product for use in conjunction with a digital pilot notepad including a touchscreen device, an avionics interface, and a controller coupled to the touchscreen device and to the avionics interface, the program product comprising:
a digital pilot notepad program configured to:
receive, at the touchscreen device, handwritten command data provided by a pilot and describing a navigational command implemented utilizing a flight deck system;
convert, at the controller, the handwritten command data into alphanumeric command data in a format suitable for submission to the flight deck system; and
submit, via the avionics interface, the alphanumeric command data to the flight deck system; and
non-transitory, computer-readable media bearing the digital pilot notepad program.

* * * * *